Patented Jan. 18, 1944

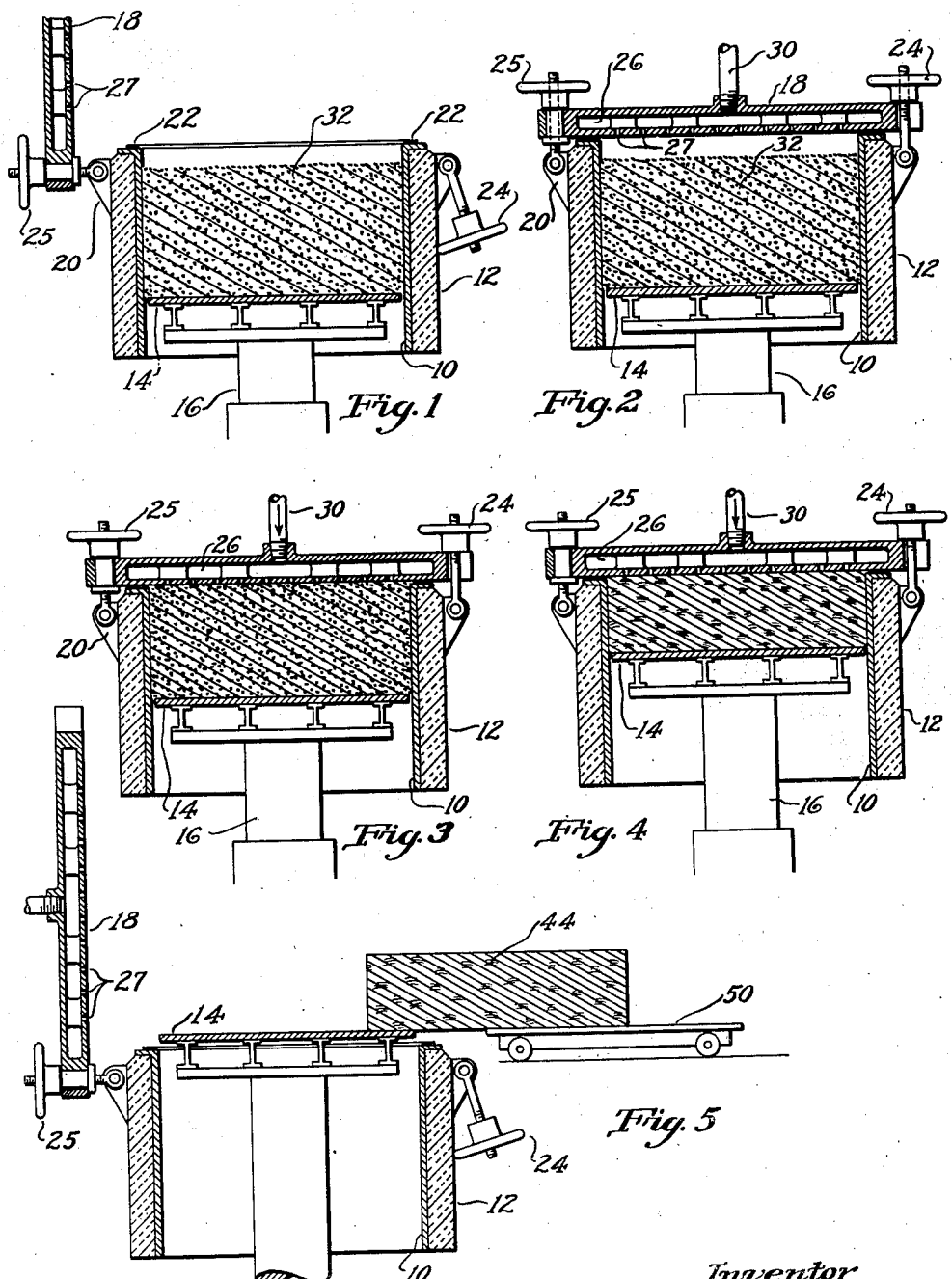

2,339,458

UNITED STATES PATENT OFFICE 2,339,458

METHOD OF MAKING CORK INSULATION

Ralph P. Champney, Dearborn, Mich., assignor to Mitchell & Smith, Incorporated, Detroit, Mich., a corporation of Massachusetts Application August 2, 1940, Serial No. 349,998

5 Claims. (Cl. 18—48)

The present invention relates to a method for forming blocks of cork from natural cork granules by baking or the like.

The purpose and object of the invention is to provide a simple and convenient method for so doing, which represents an economy in time required for baking and cooling of the mass, and which results in a product superior to those heretofore produced principally in the even and uniform cooking or baking throughout, and the avoidance of burned or charred masses within the block.

In the accompanying drawing illustrating the preferred form of the invention, Fig. 1 represents a section in elevation of the individual oven with a loose mass of granules contained therein; Fig. 2 is a similar view showing the top seal in place to close and seal the oven; Fig. 3 is a similar view illustrating the upward movement of the hydraulic ram to restrict the cubical capacity of the oven and insure that the mass of cork granules completely fill the space with the expulsion of air therefrom; Fig. 4 is a similar view with a continued upward movement of the ram by which the cooled mass is compacted into its final form; and Fig. 5 represents a view with the top seal removed and the finished cork block transferred directly to a dolly or carrier maintained at the same level as the top sealing plate.

Referring particularly to the illustrated embodiment of the invention, each individual oven is shown as provided with a metallic shell 10 having insulating walls 12, a movable bottom 14 which is mounted at the upper end of a hydraulic ram 16 as will be hereinafter described, and a cover member 18 hinged to the oven at 20. As indicated in Figs. 2 and subsequently, the cover may be closed to seal the top of the oven through a gasket 22, and is clamped in sealing position through the hand wheels 24 and 25.

As indicated, the cover member is hollow as shown at 26, perforated at 27 to permit the delivery of steam interiorly of the oven, and provided with a steam connection centrally located as at 30. The interior of the oven may be filled with a loose mass of cork granules indicated generally at 32, and after sealing with the cover member the space within the oven is contracted by movement of the bottom 14 through action of the ram 16. The completed block, after baking considerably smaller than the loose mass, is indicated at 44 and is removed after elevation of the cover member and the bottom 14, as shown in Fig. 5, to a carriage or dolly 50, the platform of which is approximately the same level as that of the oven bottom so that the cork may be transferred with the least possibility of breakage of the fragile contents.

Generally speaking, the process as carried out in the above-described form of apparatus, is substantially as follows. The interior of the oven encompasses a space approximately 39 inches square, and may be filled with a mass of loose cork granules considerably greater in depth than that of the finished block. As the finished block requires compression, the depth of the oven must be such as to permit sufficient compression to produce a block of the desired thickness and density after compression. In the above-described construction the cork block finally delivered from the oven is approximately 13½ inches in thickness, and the loose mass of cork granules delivered to the oven initially may be on the order of 21 or 22 inches or thereabouts.

After delivery of the loose mass of cork granules to the oven cavity of desired depth, the sealing cover is closed and clamped down to produce a steam seal. The hydraulic ram then elevates the floor of the cavity sufficiently to remove the bulk of the air from the mass of cork granules, and thereafter the ram is backed off slightly to cause the granules to clear the top plate. Superheated steam at a temperature of 450° to 550° F. is then introduced directly to the cavity through the perforated inner wall of the top lid. This may be delivered, as will be obvious to those skilled in the art, from superheaters which may be individually located in close proximity to each oven. The cooking time required with this superheated steam is on the order of 15 to 20 minutes, and upon completion the superheated steam is cut off and saturated steam at approximately 285° F. is delivered to the interior of the sealed cavity through the same inlet pipe 30. The efficiency of this saturated steam as a cooling medium is so great that a period of 15 minutes or thereabouts is only necessary to reduce the temperature of the mass to approximately 350° to 360° F., at which it may be safely removed from the cavity. The great virtue of the saturated steam cooling treatment is due to the fact that it terminates cooking virtually instantaneously, and is by all odds the most effective known method for controlling cooking time. In methods previously employed, after raising the temperature the difficulty of reducing the heat internally of the block inevitably meant that cooking proceeded over an indeterminate period in different portions of the block, and more frequently than not resulted in a charred appearance in individual portions of the block.

Coincidently with the cooling by saturated steam, the hydraulic ram is raised either continuously or in two or more stages to increase the pressure upon the block in process of cooling, and to gradually reduce the thickness of the finished block to the final depth of 13½ inches approximately. Apparently there is nothing critical about the manner in which the pressure is applied, and it may be varied during the cooling period without substantially altering the physical qualities of the finished block. However, the best known method at present is to apply the pressure and decrease the cubical capacity of the block progressively during the cooling period, with the block reduced to its approximately desired finished size and density at the time at which cooling is completed.

At the completion of the cooling period the block may be removed at a temperature of 350° to 360° approximately, and either left in this form or sawed or cut as desired without serious danger of charring or over-cooking if allowed to stand exposed to atmosphere. This is due generally to the fact that the temperature at which the cork chars must be in excess of 360° to 370° F. approximately.

It will be observed that with such a method of cooling the saturated steam forms an ideal cooling fluid which can instantly permeate the mass of hot cork granules, that it exerts an equal cooling effect throughout the mass and creates a reducing or non-oxidizing atmosphere to prevent charring or cooking of the cork at the high temperature, and is of such a nature that it may be instantly introduced to terminate the cooking at the end of a given time; in other words, for the first time permitting cooking at a predetermined temperature for a predetermined time with results that are entirely commensurate with this predetermined form of operation.

What is claimed is:

1. The method of baking natural cork granules which consists in subjecting the granules in a closed oven to the action of superheated steam, and thereafter without exposing the cork mass to atmosphere introducing a cooling fluid of a non-oxidizing character to reduce the temperature of the cork mass rapidly and uniformly below the cooking range and to a point at which it may be exposed to the atmosphere without further combustion.

2. The method of baking natural cork granules which consists in assembling the loose cork granules within a closed oven, introducing superheated steam into the closed oven for a sufficient period of time to accomplish the baking function, thereafter rapidly cooling the mass of cork granules through the introduction to the closed oven of saturated steam at a temperature below the cooking range of the cork, and removing the cork mass from the oven.

3. The method of baking natural cork granules which consists in assembling the loose cork granules within a closed oven, introducing superheated steam into the closed oven for a sufficient period of time to accomplish the baking function, thereafter rapidly cooling the mass of cork granules through the introduction to the closed oven of saturated steam at a temperature below the cooking range of the cork, compressing the cork mass during treatment with saturated steam, and removing the condensed cork mass from the oven.

4. The method of baking natural cork granules which consists in subjecting the granules in a closed oven to the action of a heating fluid in the absence of air, continuing the treatment for a predetermined length of time, and thereafter discontinuing the treatment and immediately permeating the cork mass with cooling fluid to reduce the temperature thereof with substantial uniformity to a point at which further cooking is discontinued.

5. The method of baking natural cork granules which consists in assembling the loose cork granules within a closed oven, introducing superheated steam at approximately 500° F. for a time sufficient to substantially complete the baking of the cork, thereafter admitting saturated steam at approximately 285° F. to terminate the cooking by rapidly and uniformly cooling the cork mass to a temperature below approximately 360° F., whereupon the cork may be exposed to the air without charring.

RALPH P. CHAMPNEY.